(12) United States Patent
Carlz

(10) Patent No.: US 8,056,465 B2
(45) Date of Patent: Nov. 15, 2011

(54) ACTIVE IMPLEMENT DOWN FORCE SYSTEM PROVIDING REDUCED HEAT GENERATION

(75) Inventor: Randall Joseph Carlz, Bettendorf, IA (US)

(73) Assignee: Deere & Company, Moline, IL (US)

( * ) Notice: Subject to any disclaimer, the term of this patent is extended or adjusted under 35 U.S.C. 154(b) by 654 days.

(21) Appl. No.: 12/239,968

(22) Filed: Sep. 29, 2008

(65) Prior Publication Data

US 2010/0078185 A1    Apr. 1, 2010

(51) Int. Cl.
*F15B 13/042* (2006.01)
(52) U.S. Cl. .................. 91/447; 91/31; 91/420
(58) Field of Classification Search ........... 91/31, 420, 91/447; 172/2
See application file for complete search history.

(56) References Cited

U.S. PATENT DOCUMENTS

| | | | |
|---|---|---|---|
| 6,378,619 B2 * | 4/2002 | Mayerle et al. | 172/2 |
| 7,401,465 B2 | 7/2008 | Emmert et al. | |
| 7,918,285 B1 * | 4/2011 | Graham et al. | 172/2 |

* cited by examiner

*Primary Examiner* — Michael Leslie

(57) ABSTRACT

A line connects the tractor hydraulic power beyond supply to the pressure reduction valve that is connected to the implement cylinder ends and automatically controls implement down pressure. Fluid under pressure is supplied from a line independently of the tractor selective control valve during automatic down pressure mode operation, the selective control valve can be positioned in a float mode when the down force circuit is controlling implement down pressure. The circuit eliminates a stall signal from the selective control valve to the hydraulic pump that otherwise would cause the pump to rise to the high, heat-producing stall pressure if the selective control valve operated in an active pressure mode.

10 Claims, 1 Drawing Sheet

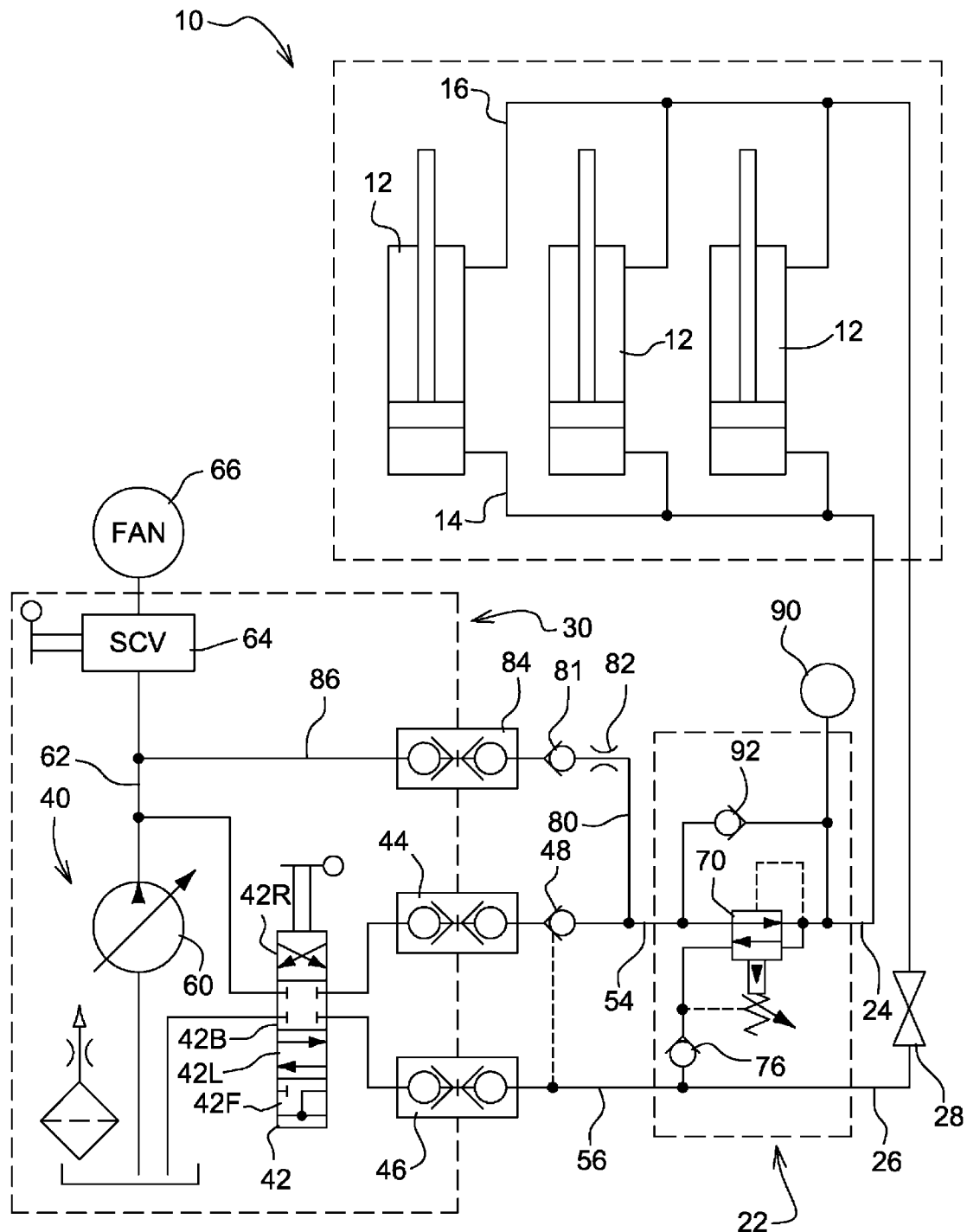

US 8,056,465 B2

ACTIVE IMPLEMENT DOWN FORCE SYSTEM PROVIDING REDUCED HEAT GENERATION

FILED OF THE INVENTION

The present invention relates generally to agricultural implements and, more specifically, to an active down force system with a hydraulic circuit that reduces heat buildup.

BACKGROUND OF THE INVENTION

Agricultural tractor hydraulic systems which operate high capacity equipment typically generate a considerable amount of heat which must be dissipated. For example, an implement such as a large seeding tool with a hydraulically driven fan often includes an active hydraulic down force system which operates simultaneously with the fan. Many tractors include an additional output port, often referred to as a power beyond pressure port, which is connected to the hydraulically powered components on the implement, to provide additional hydraulic capacity.

During activation of the down force system, the hydraulic circuit must run in a high pressure standby condition. The selective control valve on the tractor is moved to an active position, such as the lower position, and as the down pressure control valve adjusts pressure to the implement cylinders the hydraulic pump receives a signal from the system indicating a stalled condition. The stall signal causes the pump to run at the high pressure condition which requires more power and generates more heat. Under certain extreme temperature conditions, tractors with marginal hydraulic cooling systems may overheat.

SUMMARY OF THE INVENTION

It is therefore an object of the present invention to provide an improved hydraulic circuit for an agricultural implement. It is a further object to provide such a circuit which overcomes the aforementioned problems.

It is another object of the present invention to provide an improved hydraulic circuit for an agricultural implement which operates a driven unit such as a large fan on a seeder while facilitating simultaneous operation of a down pressure system. It is another object to provide such a system which substantially reduces hydraulic system heat buildup compared to conventional multi-purpose hydraulic circuits operating comparable systems. It is a further object to provide such a circuit which may be easily retrofitted to existing implements and which is relatively inexpensive.

Additional valve components are configured into the active down force circuit to cause the tractor hydraulic system to operate below the stall or high pressure standby condition. A check valve connects the tractor power beyond supply line to the pressure reduction valve that is connected to the implement cylinder ends and controls down pressure. The tractor selective control valve is then operated at load pressure in the float mode when the down force circuit is controlling implement down pressure. The circuit eliminates a stall signal to the hydraulic pump that otherwise would cause the pump to rise to the high, heat-producing stall pressure when operating in the active pressure mode. During implement lift, a check valve allows hydraulic flow from the cylinders to bypass the pressure reduction valve. The system therefore operates at lower pressure and lower power to produce less heat and increase fuel economy. The conversion from a conventional pressure system to the more efficient down pressure system is simple and inexpensive and can be performed at locations external to the tractor.

BRIEF DESCRIPTION OF THE DRAWINGS

The single drawing FIGURE is a schematic of a hydraulic down force system configured to reduce operating pressure in the active down force mode.

DESCRIPTION OF THE PREFERRED EMBODIMENT

Referring to the drawing FIGURE, a portion of an implement 10 such as an air seeder is shown having tool lift and down pressure cylinders 12 connected in parallel by lines 14 and 16 to a hydraulic control system 20. The hydraulic control system 20 includes a pressure reduction hydraulic valve block 22 having an output 24 connected to the base ends of the cylinders 12 through the line 14 and an output 26 connected through service lock up valve 28 and the line 16 to the rod ends of the cylinders 12.

A tractor 30 includes a source of hydraulic fluid under pressure 40 connected through a tractor selective control valve 42, quick couplers 44 and 46, and a pilot operated check valve 48 to inputs 54 and 56 of the valve block 22. The source 40 includes a controlled pump 60, typically a piston pump, having an output 62 connected through a second tractor selective control valve 64 to a high power hydraulically operated device 66 such as a fan on the air seeder 10. The selective control valve 42 as shown includes raise, blocking, lower, and float positions (42R, 42B, 42L and 42F).

To lower the tools connected to the cylinders 12, the operator moves selective control valve 42 to the lower position (42L) to direct pressurized fluid from the pump 60 through the check valve 48, the valve block 22 and the line 14 to extend the cylinders 12. Return fluid flow from the cylinders 12 passes through the line 16 and the valve 28 to the line 56 and back to reservoir through the selective control valve 42. System pressure at 62, typically on the order of 1800 psi, is directed to the selective control valve 64 to selectively power the fan 66.

In conventional systems, the check valve 48 is absent and the selective control valve 42 is detented in the lower position (42L) to maintain pressure at the input 54 during the active down pressure mode. An adjustable pressure reducing/relieving valve 70 in the valve block 22 automatically maintains the desired cylinder head pressure, typically in a range of 0 to 1200 psi. Such a circuit configuration requiring the selective control valve 42 to be in an active position results in the pump 60 receiving a stalled signal from the selective control valve 42 causing the pump 60 to run at higher pressure.

To avoid the higher pressure condition in the active down pressure mode of cylinder operation, a line 80 is connected to the input 54 downstream of the pilot operated check valve 48. The line 80 is connected through a check valve 81, a restrictor 82 and a third quick coupler 84 connected to the tractor power beyond supply at line 86. After the cylinders 12 are extended to lower the tools into ground contact, the operator moves the selective control valve 42 to the float position (42F). Hydraulic fluid under pressure is provided through the line 86, coupler 84 and restrictor 82 to the input 54. The adjustable reducing/relieving valve 70 is adjusted to the desired working pressure and selectively directs pressurized fluid from the line 54 to the base ends of the cylinders 14 when the pressure drops below the preselected working pressure. Return flow from the rod ends of the cylinders 12 is through the line 16, the connector 46 and the selective control valve 42 (42F) back to reservoir. When the pressure rises above the desired working pressure at the valve output 24, the valve 70 moves (down as viewed in the FIGURE) to allow hydraulic fluid to flow from the base ends of the cylinders 12 through a check valve 76 and back to reservoir. A down force indication is provided at a pressure gauge 90. With the selective control valve 42 positioned in the float position (42F) for active down pressure operation, no stalled signal is provided to the pump 40 during normal operation in the field thereby avoiding overpressure situations. Power requirements are reduced as a result, and problems related to hydraulic fluid overheating are reduced or eliminated.

To raise the tools from the ground, the operator moves the selective control valve 42 to the raise position (42R) to direct hydraulic fluid under pressure from the pump 60 to the rod ends of the cylinders 12 through the port 56 and the line 16. The pilot operated check valve 48 opens in response to the pressure increase at the port 56 to allow fluid from the base ends of the cylinders 12 to flow through a bypass check valve 92, the pilot operated check valve 48, and the selective control valve 42 back to reservoir.

Having described the preferred embodiment, it will become apparent that various modifications can be made without departing from the scope of the invention as defined in the accompanying claims.

The invention claimed is:

1. An improvement in an active hydraulic down pressure system for an agricultural implement having down pressure cylinder structure and operable in an automatically controlled down pressure mode, the system also including a hydraulically powered device and a source of hydraulic fluid under pressure, a first multi-position selective control valve connected between a fluid output on the source and the hydraulically powered device, a multi-position operator selective control valve connected between the source and the down pressure cylinder structure and including an adjustable pressure valve having an input connected between the operator selective control valve for maintaining down pressure of the cylinder structure at a preselected level, the operator selective control valve having a raise, a lower and a float position, the improvement comprising a check valve connected between the operator selective control valve and the adjustable pressure valve, and a fluid line connected to the fluid output on the source and to the input of the adjustable pressure valve downstream of the check valve, the fluid line providing a source of hydraulic fluid under pressure to the adjustable pressure valve independently of hydraulic fluid under pressure from the operator selective control valve so that the operator selective control valve is operable in the float position while the implement is operating in the automatically controlled down pressure mode.

2. The system as set forth in claim 1 including a restrictor connected to the fluid line.

3. The system as set forth in claim 1 wherein including first and second ports connected to the operator selective control valve and to the adjustable pressure valve, and a third port connected directly to the fluid output on the source, wherein the third port is connected to the input of the adjustable pressure valve.

4. The system as set forth in claim 3 wherein the check valve comprises a pilot operated check valve connected in series with the second port and having a pilot line connected to the first port.

5. The system as set forth in claim 4 wherein the second port is connected through the pilot operated check valve to the input of the adjustable pressure valve.

6. An active hydraulic down pressure system for an agricultural implement having a down pressure cylinder and operable in a controlled down pressure mode, the system also including a hydraulically powered fan, and a source of hydraulic fluid under pressure, a first selective control valve connected between a fluid output on the source and the hydraulically powered fan, a second selective control valve connected between the source and the down pressure cylinder, an adjustable pressure valve having an input connected between the second selective control valve for maintaining down pressure of the cylinder at a preselected level, the second selective control valve moveable between an active position and a float position, a directional flow control valve connected between the second selective control valve and the adjustable pressure valve, and a fluid line connected to the fluid output on the source and to the input of the adjustable pressure valve downstream of the directional flow control valve, the fluid line providing a source of hydraulic fluid under pressure to the adjustable pressure valve when the second selective control valve is in the float position and the cylinder is operating in the controlled down pressure mode.

7. The system as set forth in claim 6 wherein the directional flow control valve comprises a pilot operated check valve responsive to pressure at one end of the cylinder.

8. The system as set forth in claim 6 including first and second implement couplers connected to the second selective control valve, a power beyond pressure coupler connected to the source independently of the first and second selective control valves, wherein the fluid line is connected to the power beyond pressure coupler.

9. The system as set forth in claim 8 further comprising a restrictor connected to the fluid line between the power beyond pressure coupler and the adjustable pressure valve.

10. The system as set forth in claim 8 wherein the directional flow control valve comprises a pilot operated check valve having a pilot line connected to the first coupler and a pressure input connected to the second coupler, the pilot line opening the pilot operated check valve when the first coupler is pressurized, wherein the check valve prevents hydraulic fluid flow from the fluid line back through the second coupler to the second selective control valve when the system is operating in the controlled down pressure mode and the second control valve is in the float position.

* * * * *